United States Patent [19]

Snell

[11] 4,201,072
[45] May 6, 1980

[54] TOOL FOR INSTALLATION OF TOGGLE-SCREW ANCHORS

[76] Inventor: John H. Snell, 1300 S. Broadway, Lantana, Fla. 33462

[21] Appl. No.: 971,346

[22] Filed: Dec. 20, 1978

[51] Int. Cl.² ............................................. B21J 15/38
[52] U.S. Cl. ........................................ 72/114; 72/391; 72/454
[58] Field of Search ............................ 72/391, 114, 454; 29/243.53, 243.54, 243.5; 145/50

[56] References Cited

U.S. PATENT DOCUMENTS

| | | | |
|---|---|---|---|
| 1,102,937 | 7/1914 | Malaby | 72/391 |
| 2,428,458 | 10/1947 | Hollwarth | 72/391 |
| 2,641,378 | 6/1953 | Wilt | 72/391 |
| 3,587,271 | 6/1971 | Rigot | 72/114 |
| 3,861,185 | 1/1975 | Maddox | 72/114 |
| 3,933,019 | 1/1976 | Underland | 72/391 |
| 4,038,851 | 8/1977 | Coloma | 72/114 |
| 4,086,799 | 5/1978 | Brendle | 72/114 |
| 4,121,444 | 10/1978 | Duran | 72/114 |

Primary Examiner—Francis S. Husar
Assistant Examiner—Gene P. Crosby
Attorney, Agent, or Firm—Maky, Renner, Otto & Boisselle

[57] ABSTRACT

A tool for toggle-screw anchors in which the anchor sleeve has flanged and threaded ends and an intermediate longitudinally slotted section which collapses radially outwardly (to grip the rear side of a wall while the flanged end is engaged with the front side of the wall) upon movement of the threaded end toward the flanged end, the tool herein being characterized in the provision of an L-shaped body having an elongated tubular leg with an actuating screw extending therethrough and projecting axially beyond one end thereof for screwing of the anchor sleeve thereonto with its flange snugly engaged with one end of the tubular leg while the other end of the tubular leg is engaged by the head of the screw. The body also has an elongated radially extending leg which is adapted to be held against the front side of the wall to position the tubular leg, screw, and anchor sleeve thereon perpendicular to the wall when the anchor sleeve is inserted into the hole in the wall. The outer end of the tubular leg constitutes a bearing surface as high torque is applied on the screw as by a cross bar or by a wrench engaged with wrench-engaging flats on the head of the screw to cause drawing of the threaded end of the anchor toward the flanged end while the radially extending leg of the body is held against the front side of the wall and against turning.

3 Claims, 5 Drawing Figures

U.S. Patent May 6, 1980 4,201,072
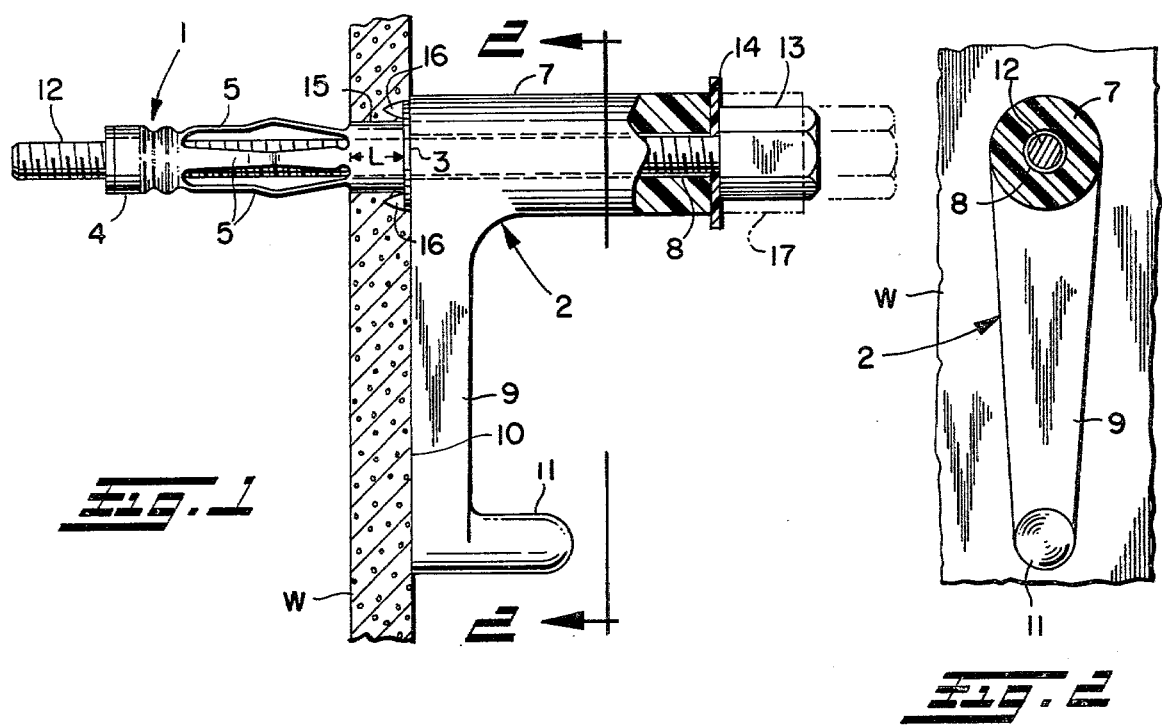
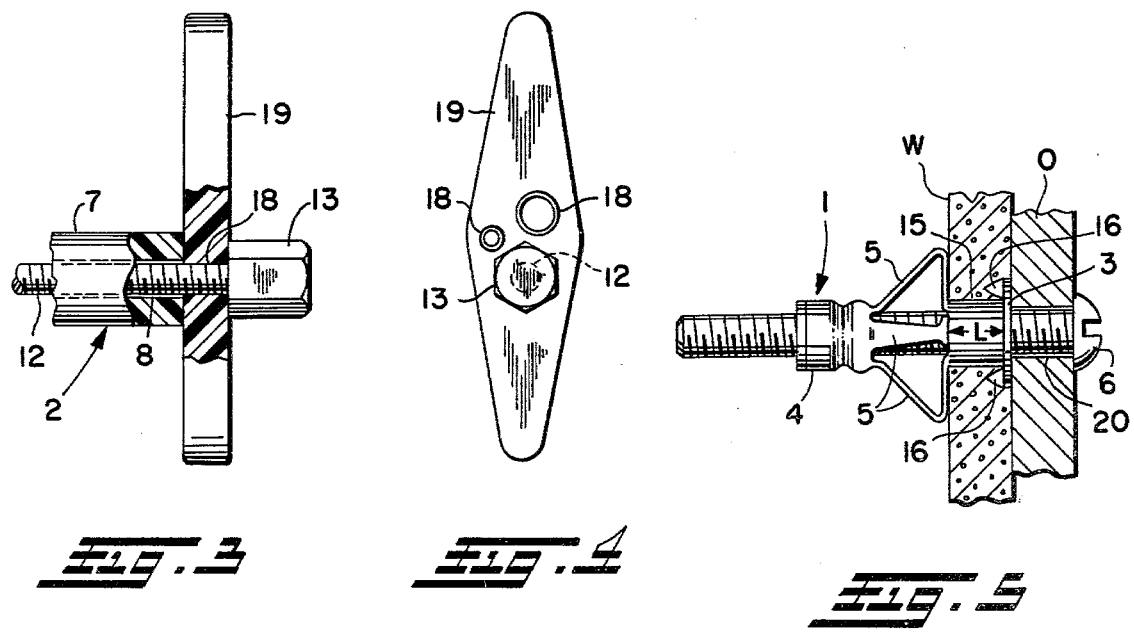

TOOL FOR INSTALLATION OF TOGGLE-SCREW ANCHORS

BACKGROUND OF THE INVENTION

Interior walls of office buildings, homes, apartments, etc. are usually of so-called drywall construction which has poor nail and screw-holding power except at the location of the studs. A common form of hollow wall anchor is the toggle-screw anchor, e.g. MOLLY brand screw anchor. In the installation of such screw anchor, a hole is drilled through the wall and the anchor is pushed through the hole with its flange engaging the front side of the wall and, generally, the screw head of the anchor is tapped with a hammer to embed the spurs or tangs of the flange of the anchor sleeve into the wall. Thereafter, the screw is turned with a screwdriver under considerable torque and axial pressure to initiate the drawing of the threaded end of the anchor sleeve toward the flanged end to cause collapsing of the intermediate section of the anchor sleeve into gripping engagement with the rear side of the wall. Occasionally, the large forces applied by the screwdriver may cause the flanged end of the anchor sleeve to be pushed through the wall, or may cause slipping of the screwdriver and consequent marring of the wall surface. Moreover, if the hole in the wall is not perpendicular to the wall, the screwdriver is ineffective to correctly position the collapsed anchor sleeve perpendicular to the wall.

Known tools for installation of toggle-screw anchors, as disclosed for example in the U.S. Pat. Nos. to Hollwarth 2,428,458 and Coloma 4,038,851 are of complex and expensive construction and operate on the principle of pivoted toggle levers which are operative to axially draw the threaded end of the anchor sleeve toward the flanged end for collapsing the same. In these constructions the levers are spread apart in use and hence are not suitable for installation of toggle-screw anchors in close quarters as in the corner of a room, near the ceiling or floor.

SUMMARY OF THE INVENTION

In contradistinction to known tools for installation toggle-screw anchors, the tool constituting the present invention is of simple, lightweight construction including an L-shaped body of injection molded plastic material such as nylon including an elongated tubular leg for the anchor sleeve collapsing screw and an elongated radially extending leg which is perpendicular to the tubular leg and has a planar wall engaging surface flush with the inner end of the tubular leg. The anchor sleeve collapsing screw has a head adjacent to the outer end of the tubular leg with wrench engaging flats or with a cross bar by means of which high torque may be applied on the screw for causing collapse of the anchor sleeve without imposing push-through axial pressure on the flange of the anchor sleeve and while holding the actuating screw and anchor sleeve perpendicular to the wall by holding the radially extending leg against the wall and against turning.

Other objects and advantages will appear from the ensuing description.

BRIEF DESCRIPTION OF THE DRAWING

In said annexed drawing:

FIG. 1 is a side elevation view partly in cross-section showing one form of tool ready to effect setting of the sleeve of a toggle-screw anchor;

FIG. 2 is a cross-section view taken substantially along the line 2—2 of FIG. 1;

FIG. 3 is a side elevation view partly in cross-section showing a T handle for turning the actuating screw;

FIG. 4 is an end view as viewed from the righthand end of FIG. 3; and

FIG. 5 is a cross-section view showing the collapsed screw anchor in use in supporting a load.

DETAILED DESCRIPTION OF THE PREFERRED EMBODIMENTS

The toggle-screw anchor sleeve 1 with which the present tool 2 is adapted to be used comprises flanged and threaded ends 3 and 4 and an intermediate longitudinally slotted section which leaves partially prebent strips 5 which are bent and spread apart when the threaded end 4 of the sleeve 1 is drawn axially toward the flanged end 3. The deformed condition of the anchor sleeve 1 is shown in FIG. 5 which also shows the anchor screw 6 in place holding an object O against the wall W. The wall W herein shown by way of example is a drywall panel which comprises a plaster-like material between layers of paper on opposite sides and which is nailed or screwed to wall studs in well known manner.

As well known toggle-screw anchors (sleeves 1 and screws 6) are available in numerous sizes, for example Nos. 6–32, 10–24, and ¼"–20 and in various grip lengths L from about ⅛" to well over 1" for installation in walls or other objects of different thicknesses.

As shown in FIGS. 1 and 2, the tool 2 herein comprises an L-shaped body as of injected molded plastic material such as nylon, to provide an elongated tubular leg 7 having a central passage 8 therethrough which, in the case of a tool 2 for use with sizes of anchors previously mentioned, would be of diameter slightly greater than ¼". Said body includes an elongated radially extending leg 9 which is perpendicular to said tubular leg 7 and has a planar wall-engaging surface 10 flush with the inner end of the tubular leg 7, said leg 9 at its radially outer end terminating in an axial projection 11 parallel to the tubular leg 7.

Extending through the passage 8 of the tubular leg 7 is an actuating screw 12 having a hex or like head 13 with a nylon or like washer 14 interposed between the head 13 and the axially outer end of the tubular leg 7.

In installing an anchor sleeve 1 in the wall W, a hole 15 is drilled in the wall W (side wall or ceiling) and the anchor sleeve 1 is screwed on the projecting end of the screw 12 until the flange 3 snugly engages the inner end of the tubular leg 7 whereupon the anchor sleeve 1 thus mounted on the screw 12 is pushed through the hole 15 in the wall W and the head 13 of the screw 12 is tapped lightly with a hammer or like tool to embed the spurs or tangs 16 of the flange 3 in the wall W surrounding the drilled hole 15. In the case of drywall, such tapping may partially or wholly embed the flange 3 in the front side of the wall W. In the event that the hole 15 is not perpendicular to the wall W, the tapping will straighten the screw 12 and anchor 1 to perpendicular position especially if the radially outer end of the leg 9 first contacts the wall W or if this does not straighten the anchor 1 to perpendicular position, the pushing of the body toward the wall W will so straighten the anchor 1 and actuating screw 12 when the surface 10 is against the wall W. For a righthanded person, the left hand may be used to hold the L-shaped body to press the surface 10 against the wall W while the projection 11 facilitates holding the body against turning. The right hand may then be used to manipulate a suitable wrench, such as a socket, Crescent, open end, or box wrench, engaged with the hex 13 to exert high torque on the actuating screw 12 sufficient to initiate drawing of the threaded end 4 of the anchor sleeve 1 toward the flanged end 3 which is held in position by inner end of the tubular leg 7, the tightening being continued until the anchor sleeve 1 is expanded to grip the inside of the wall W as shown in FIG. 5.

Even if the flange 3 of the anchor sleeve 1 is not embedded in the wall W, its thickness of about say 0.030 inch in relation to the say 2½ inch length of the leg 9 will permit only about a ½° departure of the tubular leg 7 from perpendicular relation to the wall W.

Each tool kit will be provided with actuating screws 12 of different sizes as indicated and of appropriate lengths to handle different grip lengths of anchor sleeves 1 and in the event of walls W having obstructions or having depths insufficient to accommodate the length of the actuating screw 12, a nylon or like bushing 17 of desired thickness may be interposed between the outer end of the tubular leg 7 and the head 13 of the actuating screw 12 as shown in phantom lines in FIG. 1 to decrease the length of projection of the screw 12 beyond the threaded end 4 of the anchor sleeve 1.

In manipulating the wrench as used in FIG. 1, the thumb may be used to apply axial pressure on the head 13 of the screw 12 as it is being turned additionally to prevent outward movement of the flange 3 of the anchor sleeve 1 as the threaded end 4 is drawn toward the flanged end 3. When a socket wrench is used, such axial pressure may be applied on the socket.

In FIGS. 3 and 4, the actuating screw 12 is tightly screwed into a threaded hole 18 in a cross bar 19 which provides a T handle through which high torque may be applied on the actuating screw 12 together with substantial axial pressure. For convenience to enable use of just the one handle 19 in connection with different sizes of anchors 1, the handle 19 has a cluster of tapped holes 18 for 6-32, 10-24, and ¼"-20 actuating screws 12.

when the anchor sleeve 1 has been expanded into gripping engagement with the wall W as shown in FIG. 5, the screw 6 supplied therewith is inserted through a hole 20 in the object O to be mounted on the wall W and is threadedly engaged in the threaded end 4 of the collapsed sleeve 1 to tightly secure the object O in place.

I claim:

1. A tool for installation of a toggle-screw anchor of the type including an anchor sleeve having flanged and threaded ends with an intermediate longitudinally slotted section which is radially expanded upon axial movement of the threaded end toward the flanged end; said tool comprising an L-shaped body having an elongated tubular leg with a central passage therethrough and an elongated radially extending leg at one end of said tubular leg having a plane surface perpendicular to the axis of said passage and flush with said one end of said tubular leg; and an actuating screw having head means bearing on the other end of said tubular leg and having a shank extending through said passage and axially beyond said one end for screwing thereonto an anchor sleeve with its flanged end snugly engaged with said one end whereby said projecting screw end and anchor sleeve thereon may be inserted into a hole in a wall or the like with said plane surface of said radially extending leg engaged with the outer surface of the wall to retain said tubular leg, screw, and anchor sleeve perpendicular to the wall; said screw, upon turning thereof with respect to the anchor sleeve by torque applied on its head while said radially extending leg is held against the wall and against rotation, being operative to expand the anchor sleeve to grip the inside surface of the wall around the hole; the radial extremity of said radially extending leg having an axial projection parallel to said tubular leg to facilitate holding of said body against the wall and against rotation when said actuating screw is turned.

2. A tool for installation of a toggle-screw anchor of the type including an anchor sleeve having flanged and threaded ends with an intermediate longitudinally slotted section which is radially expanded upon axial movement of the threaded end toward the flanged end; said tool comprising an L-shaped body having an elongated tubular leg with a central passage therethrough and an elongated radially extending leg at one end of said tubular leg having a plane surface perpendicular to the axis of said passage and flush with said one end of said tubular leg; and an actuating screw having head means bearing on the other end of said tubular leg and having a shank extending through said passage and axially beyond said one end for screwing thereonto an anchor sleeve with its flanged end snugly engaged with said one end whereby said projecting screw end and anchor sleeve thereon may be inserted into a hole in a wall or the like with said plane surface of said radially extending leg engaged with the outer surface of the wall to retain said tubular leg, screw, and anchor sleeve perpendicular to the wall; said screw, upon turning thereof with respect to the anchor sleeve by torque applied on its head while said radially extending leg is held against the wall and against rotation, being operative to expand the anchor sleeve to grip the inside surface of the wall around the hole; said head having a T-bar for application of high torque on said screw and for application of axial force on said tubular leg as said screw is turned; said T-bar between its ends having threaded engagement with said screw for tightly securing said T-bar against said head.

3. A tool for installation of a toggle-screw anchor of the type including an anchor sleeve having flanged and threaded ends with an intermediate longitudinally slotted section which is radially expanded upon axial movement of the threaded end toward the flanged end; said tool comprising an L-shaped body having an elongated tubular leg with a central passage therethrough and an elongated radially extending leg at one end of said tubular leg having a plane surface perpendicular to the axis of said passage and flush with said one end of said tubular leg; and an actuating screw having head means bearing on the other end of said tubular leg and having a shank extending through said passage and axially beyond said one end for screwing thereonto an anchor sleeve with its flanged end snugly engaged with said one end whereby said projecting screw end and anchor sleeve thereon may be inserted into a hole in a wall or the like with said plane surface of said radially extending leg engaged with the outer surface of the wall to retain said tubular leg, screw, and anchor sleeve perpendicular to the wall; said screw, upon turning thereof with respect to the anchor sleeve by torque applied on its head while said radially extending leg is held against the wall and against rotation, being operative to expand the anchor sleeve to grip the inside surface of the wall around the hole; said central passage being of diameter large enough to accommodate the largest one of a plurality of actuating screws for different sizes of anchor sleeves but being of smaller diameter than the diameter of the flange of the smallest one of said different size anchor sleeves; a bar-like member having between its ends a cluster of different size threaded holes therethrough to accommodate a selected one of the different size actuating screws for screwing of said bar thereonto into tight engagement with the head of the selected actuating screw for application of high torque on the selectd actuating screw and application of axial force on said tubular leg as said screw is turned.

* * * * *